United States Patent
Shore et al.

(10) Patent No.: US 9,162,776 B2
(45) Date of Patent: Oct. 20, 2015

(54) AIRCRAFT SAFETY AND CONFIGURATION MONITORING SYSTEM AND METHOD

(75) Inventors: Rebecca Shore, Seattle, WA (US); Steve Kopecki, Bonney Lake, WA (US); Winfeng Li, Renton, WA (US); William P. Coop, Buckley, WA (US); Thanh D. Hoang, Edgewood, WA (US); Swanee Yourkowski, Burien, WA (US); Kevin Yong Ung, Bellevue, WA (US); Yucheng Zheng, Sammamish, WA (US); Robert Lee Avery, Woodinville, WA (US); Christopher B. Kettering, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 735 days.

(21) Appl. No.: 12/858,572

(22) Filed: Aug. 18, 2010

(65) Prior Publication Data

US 2012/0044092 A1    Feb. 23, 2012

(51) Int. Cl.
G08B 21/00    (2006.01)
B64F 5/00    (2006.01)
B64D 45/00    (2006.01)
G07C 5/00    (2006.01)

(52) U.S. Cl.
CPC ........... *B64F 5/00* (2013.01); *B64D 2045/0085* (2013.01); *G07C 5/006* (2013.01)

(58) Field of Classification Search
CPC ... B64D 45/0015; G01C 23/00; G08G 5/0013
USPC ........................................................ 340/945
See application file for complete search history.

(56) References Cited

U.S. PATENT DOCUMENTS

| | | | |
|---|---|---|---|
| 5,524,272 A * | 6/1996 | Podowski et al. | 725/74 |
| 6,043,746 A | 3/2000 | Sorrells | |
| 6,812,841 B2 | 11/2004 | Heinrich et al. | |
| 6,842,121 B1 | 1/2005 | Tuttle | |
| 7,030,760 B1 * | 4/2006 | Brown | 340/568.1 |
| 7,064,668 B2 | 6/2006 | Porad | |
| 7,545,274 B2 | 6/2009 | Coop | |
| 7,551,086 B2 | 6/2009 | Coop et al. | |
| 7,589,636 B2 | 9/2009 | Ayyagari et al. | |
| 7,605,688 B1 | 10/2009 | Seah | |
| 7,649,476 B2 | 1/2010 | Hutton | |
| 2005/0288947 A1 * | 12/2005 | Mallonee et al. | 705/1 |
| 2007/0112608 A1 * | 5/2007 | Avery et al. | 705/8 |
| 2007/0114280 A1 * | 5/2007 | Coop et al. | 235/385 |
| 2007/0132581 A1 * | 6/2007 | Molyneaux et al. | 340/551 |
| 2008/0159158 A1 * | 7/2008 | Poisson et al. | 370/249 |
| 2009/0143923 A1 * | 6/2009 | Breed | 701/1 |
| 2009/0145923 A1 * | 6/2009 | Raterman | 222/54 |
| 2009/0182515 A1 * | 7/2009 | Pado et al. | 702/36 |
| 2010/0050709 A1 * | 3/2010 | Neville | 70/158 |
| 2010/0156606 A1 * | 6/2010 | Gold | 340/10.4 |
| 2013/0044007 A1 * | 2/2013 | Paavilainen | 340/945 |

* cited by examiner

*Primary Examiner* — George Bugg
*Assistant Examiner* — Anthony D Afrifa-Kyei
(74) *Attorney, Agent, or Firm* — Parsons Behle & Latimer

(57) ABSTRACT

An aircraft safety and configuration monitoring system includes a plurality of RFID equipped items, a plurality of RFID interrogators communicating with the plurality of RFID equipped items, a processor communicating with the plurality of RFID interrogators and adapted to determine an issue with respect to any of the plurality of RFID equipped items and an indicating mechanism communicating with the processor and adapted to indicate the issue.

20 Claims, 11 Drawing Sheets

AIRCRAFT SAFETY AND CONFIGURATION MONITORING SYSTEM AND METHOD

TECHNICAL FIELD

The disclosure generally relates to aircraft safety and configuration management systems and methods. More particularly, the disclosure relates to an aircraft safety and configuration monitoring system and method which automatically monitors aircraft safety and configuration process data and reports the data to an airline maintenance operation check (AMOC) system or the like for security, supply chain and maintenance planning purposes.

BACKGROUND

Currently many airlines' aircraft safety and configuration management processes may be completed manually during pre-flight, through, heavy and line maintenance checks to ensure that necessary standard equipment items are present and in working condition and allow the aircraft proper certification to fly. Visibility of aircraft configuration and issues may automatically lead to fewer inspections, improved configuration management and safety, inventory reductions and reduced labor required to validate part compliance.

The current manual monitoring processes may be time-consuming and prone to human error and thus, may not identify all of the existing issues. Therefore, in order to automate the process and ensure continuous accurate and reliable monitoring of the aircraft configuration, RFID (Radio Frequency Identification) interrogators may be integrated into pre-existing systems throughout the pressurized cabin of the aircraft. The RFID interrogators may sweep the aircraft and report issues through an on-board system to the flight deck, which may pass the information on to the airline maintenance operation check (AMOC) or equivalent system. In turn, the AMOC or other system may trigger actions in the supply chain and initiate necessary maintenance. This may reduce cycle time, improve on-time departures and safety and remove the manual procedures and human error out of current processes.

Therefore, an aircraft safety and configuration monitoring system and method in which aircraft safety and configuration process data are automatically monitored and reported to an airline maintenance operation check (AMOC) system or the like for security, supply chain and maintenance planning purposes are needed.

SUMMARY

The disclosure is generally directed to an aircraft safety and configuration monitoring system. An illustrative embodiment of the system includes a plurality of RFID equipped items, a plurality of RFID interrogators communicating with the plurality of RFID equipped items, a processor communicating with the plurality of RFID interrogators and adapted to determine an issue with respect to any of the plurality of RFID equipped items and an indicating mechanism communicating with the processor and adapted to indicate the issue.

In some embodiments, the system may include an aircraft; a plurality of RFID equipped items on the aircraft; a plurality of RFID interrogators communicating with the plurality of RFID equipped items; a processor communicating with the plurality of RFID interrogators and adapted to determine an issue with respect to any of the plurality of RFID equipped items; and an indicating mechanism communicating with the processor and adapted to indicate the issue.

The disclosure is further generally directed to an aircraft safety and configuration monitoring method. An illustrative embodiment of the method includes identifying a plurality of items to be monitored on an aircraft; placing a plurality of RFID tags on the plurality of items, respectively; monitoring the plurality of RFID tags for issues involving the plurality of items; and reporting any of the issues in the event that any of the issues materializes.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
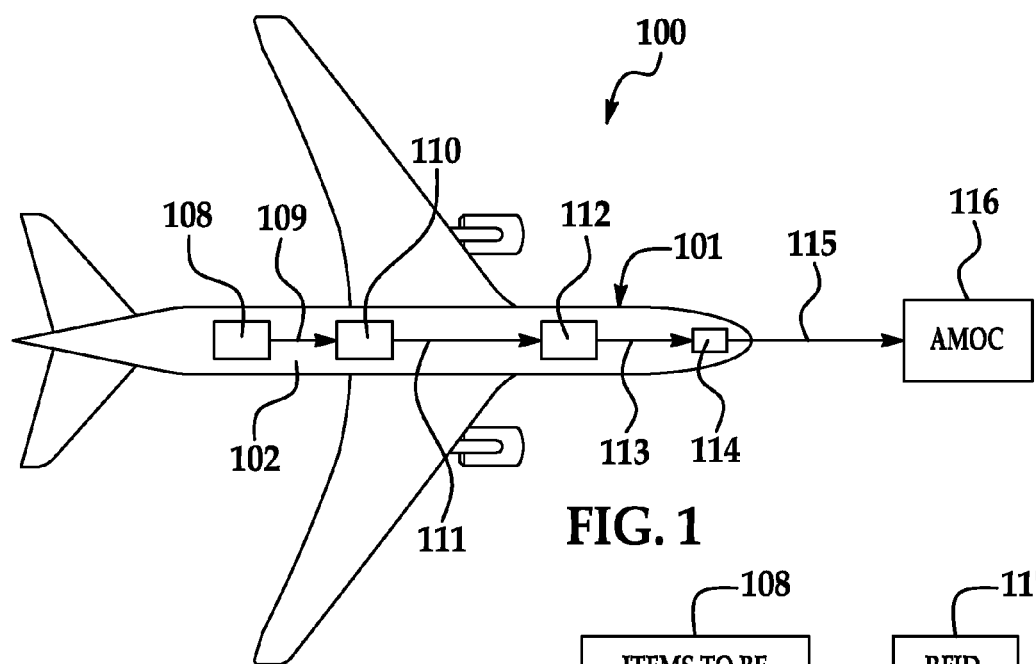
FIG. 1 is a block diagram illustrating components of an illustrative embodiment of the aircraft safety and configuration monitoring system.
Figure 1A:
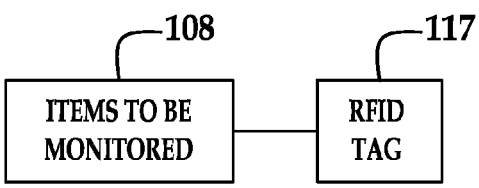
FIG. 1A is a block diagram illustrating an RFID tag attached to an item to be monitored on board an aircraft.

Referring initially to FIGS. 1 and 1A, an illustrative embodiment of the aircraft safety and configuration monitoring system, hereinafter system, is generally indicated by reference numeral 100 in FIG. 1. The system 100 may include various RFID (Radio Frequency Identification) equipped items 108 which are to be monitored aboard an aircraft 101. The RFID equipped items 108 may be components of systems which are interspersed throughout the pressurized cabin in the fuselage 102 of the aircraft 101. The RFID equipped items 108 may be components which require monitoring for the purpose of determining the need for periodic replacement and/or maintenance of the items throughout the service life of the aircraft 101. As shown in FIG. 1A, the RFID equipped items 108 may be fitted with RFID tags 117 as described in U.S. Pat. No. 7,545,274, which is incorporated by reference herein in its entirety.

RFID interrogators 110 may communicate with the RFID equipped items 108 through a communication pathway 109. The RFID interrogators 110 may be integrated into pre-existing systems throughout the pressurized cabin of the aircraft fuselage 102. The RFID interrogators 110 may be positioned throughout the entire pressurized cabin of the aircraft fuselage 102 and scanning different areas of the aircraft 101. Placement of the RFID interrogators 110 throughout the cabin of the aircraft 101 may change the processes that are necessary during checks from manual to automatic and may require process changes with how the information is read and distributed to the appropriate stakeholders and systems.

A processor 112 may communicate with the RFID interrogator 110 through a communication pathway 111. In some embodiments, the processor 112 may be an integrated cabin RFID interrogation system (ICRIS). A flight deck 114 of the aircraft 101 may communicate with the processor 112 through a communication pathway 113. The flight deck 114 of the aircraft 101 may communicate with an airline maintenance operation check (AMOC) or equivalent system 116 through a communication pathway 115. Accordingly, during monitoring of the aircraft configuration which may take place during pre-flight procedures, the RFID interrogators 110 may sweep the aircraft 101 through the communication pathway 109 to determine whether any of the RFID equipped items 108 requires service, repair, replacement and/or maintenance. In the event that any of the RFID equipped items 108 requires service, repair, replacement and/or maintenance during monitoring of the aircraft configuration, an RFID interrogator 110 may report the requirement to the processor 112 through the communication pathway 111. The processor 112 may report the requirement to the flight deck 114 through the communication pathway 113. The flight deck 114 may record the requirement in the electronic log of the aircraft 101 and transmit the requirement to the AMOC 116. In turn, the AMOC 116 may initiate the necessary service, repair, replacement and/or maintenance procedures for the RFID equipped item 108. The system 100 may provide accurate, real-time configuration management, safety and security, supply chain management and maintenance planning information to the AMOC 116. This may lead to fewer aircraft inspections, improved configuration management, improved safety, inventory reductions and reduced labor required to validate part compliance.

Figure 2:
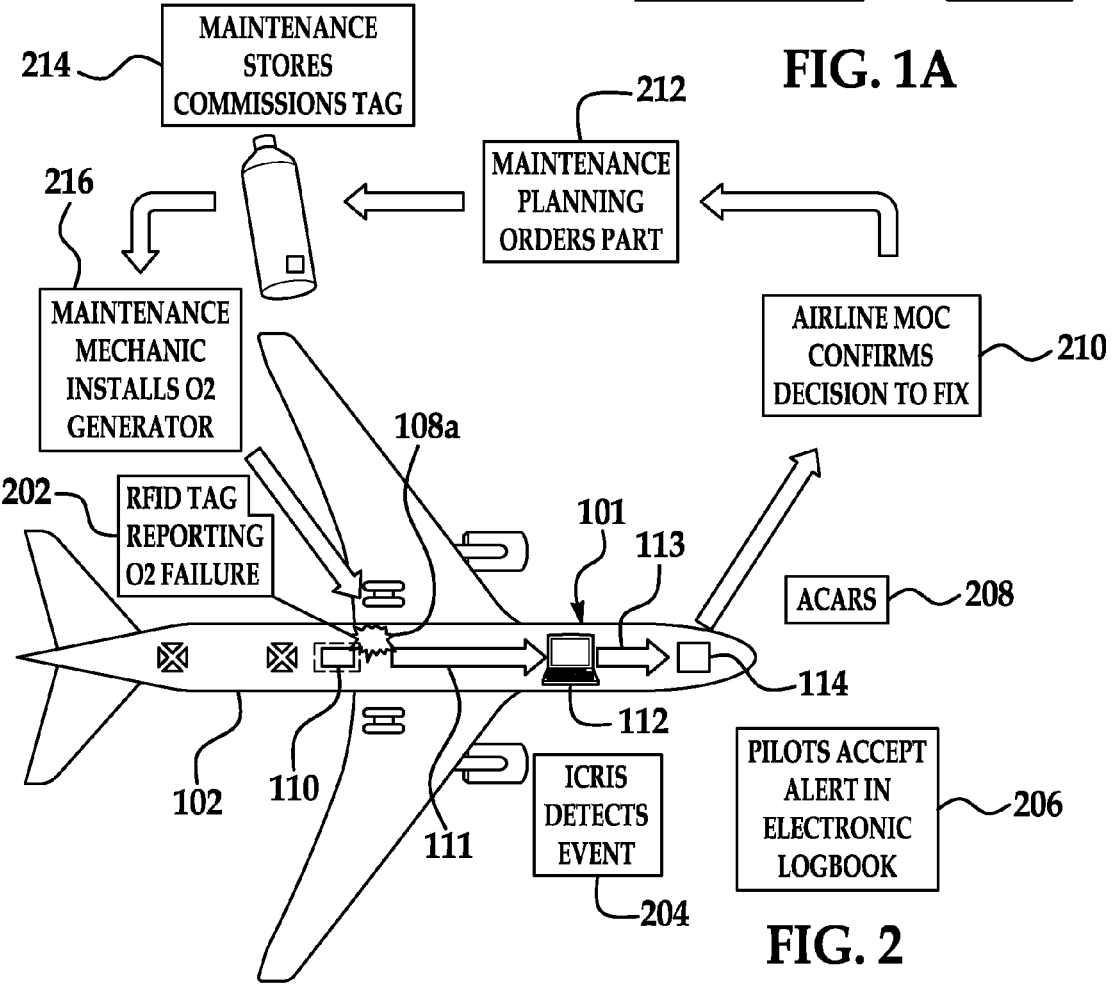
FIG. 2 is a block diagram illustrating implementation of an illustrative embodiment of the aircraft safety and configuration monitoring system in determining non-certification of an oxygen generator aboard an aircraft.

Referring next to FIG. 2, implementation of the system 100 in determining non-certification of an RFID-equipped oxygen generator 108a aboard the aircraft 101 is shown. In block 202, an RFID tag on the oxygen generator 108a may report a non-certified status of the oxygen generator 108a to an RFID interrogator 110. The non-certified status of the oxygen generator 108a may indicate that the oxygen generator 108a is not certified to fly because the oxygen generator 108a has been fired or is expired, for example and without limitation. In block 204, the processor 112 may detect the non-certified status of the oxygen generator 108a from the RFID tag and transmit the non-certified status of the oxygen generator 108a to the flight deck 114. In block 206, pilots of the aircraft 101 may accept the non-certified status of the oxygen generator 108a which may be recorded in the electronic logbook of the aircraft 101.

In block 208, the flight deck 114 may transmit the non-certified status of the oxygen generator 108a to the AMOC 116. In block 210, the AMOC 116 may confirm the decision to service, repair, replace or maintain the oxygen generator 108a. In block 212, maintenance planning may order a replacement oxygen generator 108a. In block 214, maintenance may store the commissions RFID tag of the replacement oxygen generator 108a. In block 216, a maintenance mechanic may install the replacement oxygen generator 108a in the aircraft 101.

Figure 3:
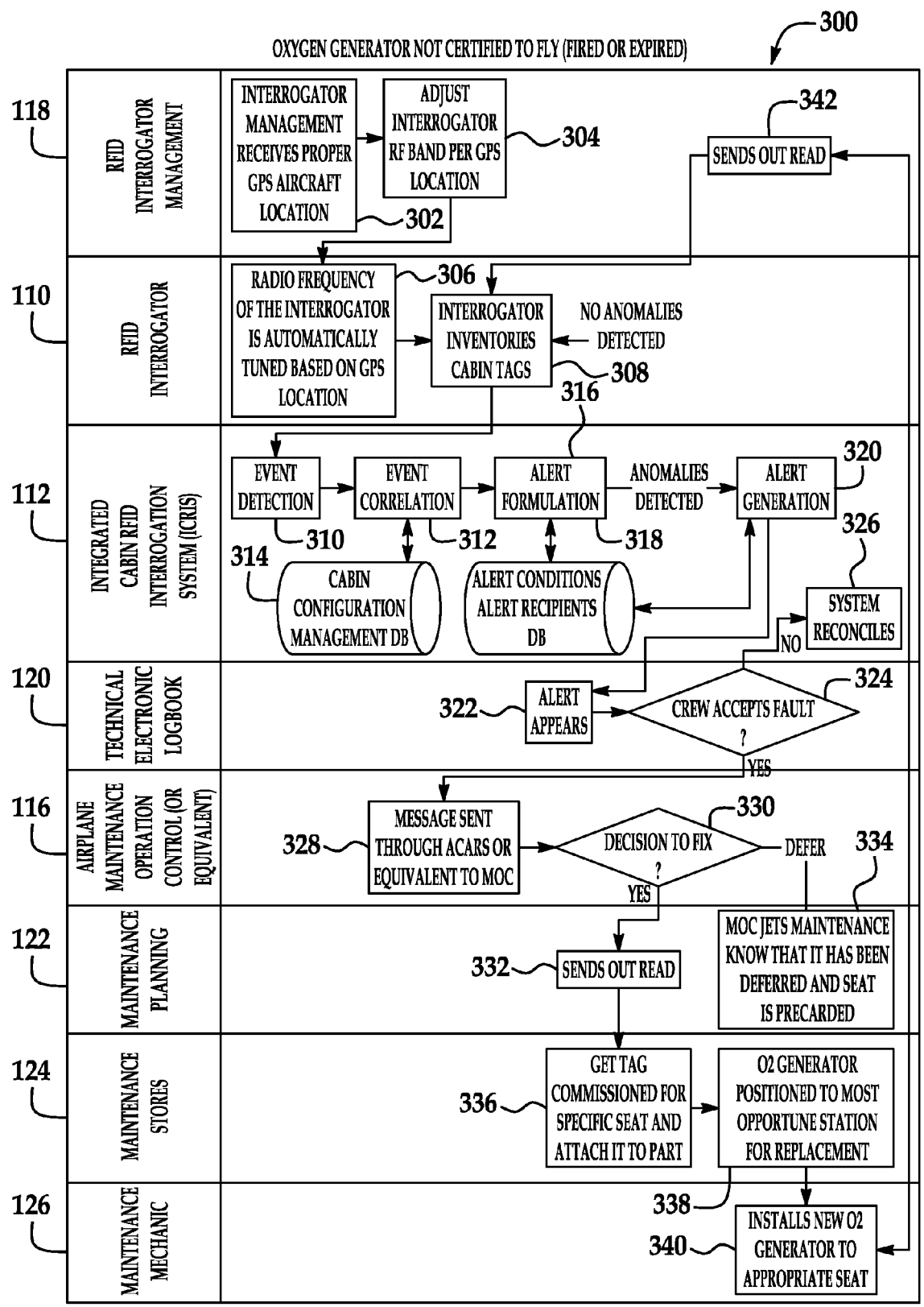
FIG. 3 is a flow diagram of an illustrative embodiment of the aircraft safety and configuration monitoring method in determining non-certification of an oxygen generator aboard an aircraft.

Referring next to FIG. 3, a flow diagram 300 of an illustrative embodiment of the aircraft safety and configuration monitoring method in determining non-certification of an oxygen generator aboard an aircraft is shown. In block 302, RFID interrogator management 118 may receive a proper GPS aircraft location for the aircraft 101. In block 304, RFID interrogator management 118 may adjust the interrogator RF band per the GPS location. In block 306, the radio frequency (RF) of the RFID interrogator 110 may be automatically tuned based on the GPS location. In block 308, the RFID interrogator 110 may inventory the cabin RFID tags of the RFID equipped items 108 (FIG. 1). In block 310, the processor 112 may make an event detection. In block 312, the processor 112 may make an event correlation using a cabin configuration management database in block 314. In block 316, the processor 112 may make an alert formulation using an alert conditions alert recipient's database in block 318. In block 320, the processor 112 may make an alert generation. In block 322, an alert may appear in the technical electronic logbook 120 in the flight deck 114 (FIG. 1). In block 324, the crew of the aircraft 101 may accept or defer the alert which appears in the electronic logbook 120 of the aircraft 101. In block 326, the system 100 may reconcile in the event that the crew does not accept the alert. In the event that the crew does accept the alert, in block 328 a message may be sent to the AMOC 116.

In block 330, the AMOC 116 may decide whether to service, repair, replace or maintain the oxygen generator. In the event that a decision is made to service, repair, replace or maintain the oxygen generator, in block 332 maintenance planning 122 may order a necessary part or parts for service, repair, replacement or maintenance of the oxygen generator. In the event that the decision to service, repair, replace or maintain the oxygen generator is deferred to the AMOC 116, in block 334 the AMOC 116 may inform maintenance that the decision has been deferred and the seat on the aircraft 101 to which the oxygen generator needs to be installed may be placarded.

In block 336, maintenance stores 124 may commission an RFID tag for the part. In block 338, maintenance stores 124 may position the oxygen generator to the most opportune station for replacement on the aircraft 101. In block 340, the new oxygen generator may be installed to the appropriate seat on the aircraft 101. In block 342, RFID interrogator management 118 may send out a read to the RFID interrogator 110 which indicated the event.

The method which was heretofore described with respect to non-certification of the oxygen generator 108a to fly may be implemented in various other situations. These may include circumstances in which a life vest has expired or is missing, in which case generally the same steps which were heretofore described with respect to non-certification of the oxygen generator 108a may be carried out. In regard to expiration of the lift vest, however, maintenance planning may order a replacement lift vest instead of an oxygen generator and a mechanic may not be necessary for installation of the replacement life vest.

Under circumstances in which a life vest has been tampered with, generally the same steps which were heretofore described with respect to non-certification of the oxygen generator 108a may be carried out. A tamper bag may be placed over the life vest cover. When the life vest is tampered with, the tag may tear, causing the antenna to break and resulting in a no-read by the RFID interrogator. The maintenance planning may order a replacement life vest instead of an oxygen generator and a mechanic may not be necessary for installation of the replacement life vest.

Under circumstances in which emergency equipment is missing, generally the same steps which were heretofore described with respect to non-certification of the oxygen generator 108a may be carried out. Maintenance planning may order a replacement piece of emergency equipment instead of a replacement oxygen generator. The replacement emergency equipment may include smoke detectors, first-aid kits, crash axes and flashlights, for example and without limitation.

Under circumstances in which the emergency equipment has been tampered with, generally the same steps which were heretofore described with respect to non-certification of the oxygen generator 108a may be carried out. A tamper bag may be placed over the outside of the emergency equipment. When the emergency equipment is tampered with, the tag may tear, causing the antenna to break and resulting in a no-read by the RFID interrogator. The maintenance planning may order replacement emergency equipment instead of an oxygen generator and a mechanic may not be necessary for installation of the replacement emergency equipment. The replacement emergency equipment may include smoke detectors, first-aid kits, crash axes and flashlights, for example and without limitation.

A Use Case Description of non-certification of the oxygen generator (fired or expired) is presented in tabular form in Table (I) below.

TABLE I

Oxygen Generator not Certified to Fly (Fired or Expired)

| | |
|---|---|
| Use Case Name | Oxygen generator is not certified to fly (fired or is expired) |
| Purpose | Aircraft is able to self-diagnose when an oxygen generator is not certified to fly and will notify appropriate systems. The oxygen generator may have failed either because it has been exposed to 400+ degrees and fired or has expired. |

TABLE I-continued

Oxygen Generator not Certified to Fly (Fired or Expired)

| | |
|---|---|
| Actors | Pilot, Maintenance Operation Center, Maintenance Planning, Mechanic |
| Pre-condition | Oxygen generator may not be certified to fly for one of the following reasons:<br>1. Oxygen generator has reached 400+ degrees Fahrenheit and automatically recorded failure.<br>2. Oxygen generator has expired. |
| Steps | 1. Interrogator inventories cabin tags.<br>2. Integrated cabin RFID interrogation system (ICRIS) detects an event.<br>3. ICRIS correlates the event against the pre-defined as flying configuration.<br>4. ICRIS identifies which tag is missing and creates an alert.<br>5. ICRIS sends an alert to the Technical Electronic Logbook.<br>6. Alert appears to pilots that oxygen generator requires attention.<br>7. Pilot accepts indication.<br>8. ICRIS system reconciles to account for failed tag.<br>9. Indication is sent through ACARS or equivalent system to Airline Maintenance Operation Control (MOC) or equivalent.<br>10. MOC or equivalent accepts notification to fix the part.<br>11. MOC operator or equivalent orders the oxygen generator.<br>12. Maintenance store commissions a tag (including seat number and expiration date) for the specific seat and attaches it to the newly acquired oxygen generator.<br>13. Oxygen generator is positioned to most opportune station for replacement.<br>14. Mechanic installs the oxygen generator above the proper seat.<br>15. During the next interrogation read, the aircraft detects a new tag.<br>16. The information from the new tag is populated by ICRIS into the as-flying configuration database. |

Figure 4:
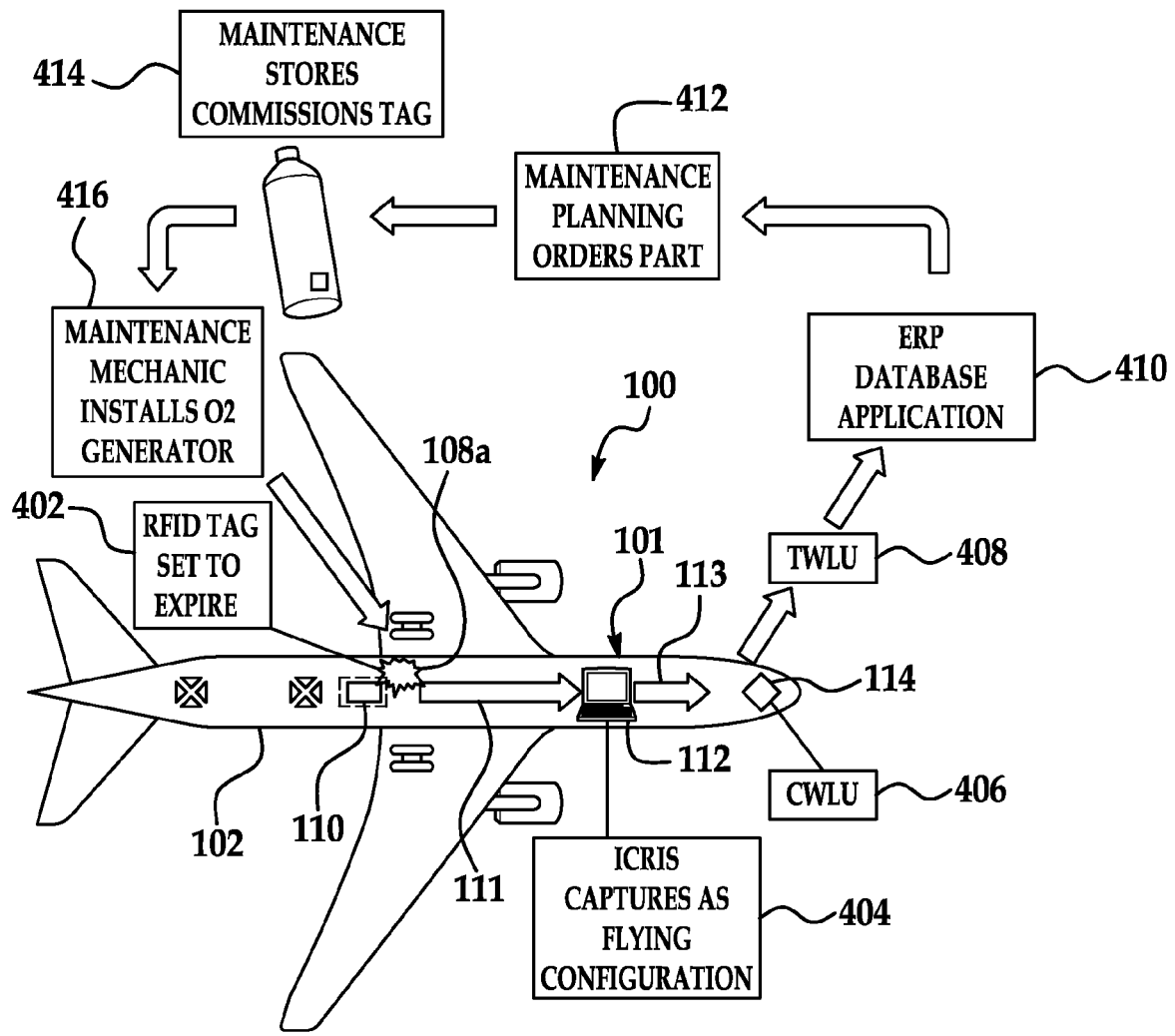
FIG. 4 is a block diagram illustrating implementation of an illustrative embodiment of the aircraft safety and configuration monitoring system in determining imminent expiration of an oxygen generator aboard an aircraft.

Referring next to FIG. 4, a block diagram 400 illustrating implementation of an illustrative embodiment of the aircraft safety and configuration monitoring system in determining imminent expiration of an oxygen generator 108a aboard the aircraft 101 is shown. In block 402, an RFID tag on the oxygen generator 108a may be set to expire. In block 404, the processor 112 may capture the expiration of the RFID tag and transmit the expired status of the RFID tag to the flight deck 114. In block 406, pilots of the aircraft 101 may accept the expired status of the oxygen generator 108a which may be recorded in the electronic logbook of the aircraft 101.

In block 408, the flight deck 114 may transmit the expired status of the oxygen generator 108a to an ERP database application (block 410) in the AMOC 116 (FIG. 1). In block 412, maintenance planning may order a replacement oxygen generator 108a. In block 414, maintenance may store a commissions RFID tag of the replacement oxygen generator 108a. In block 416, a maintenance mechanic may install the replacement oxygen generator 108a in the aircraft 101.

Figure 5:
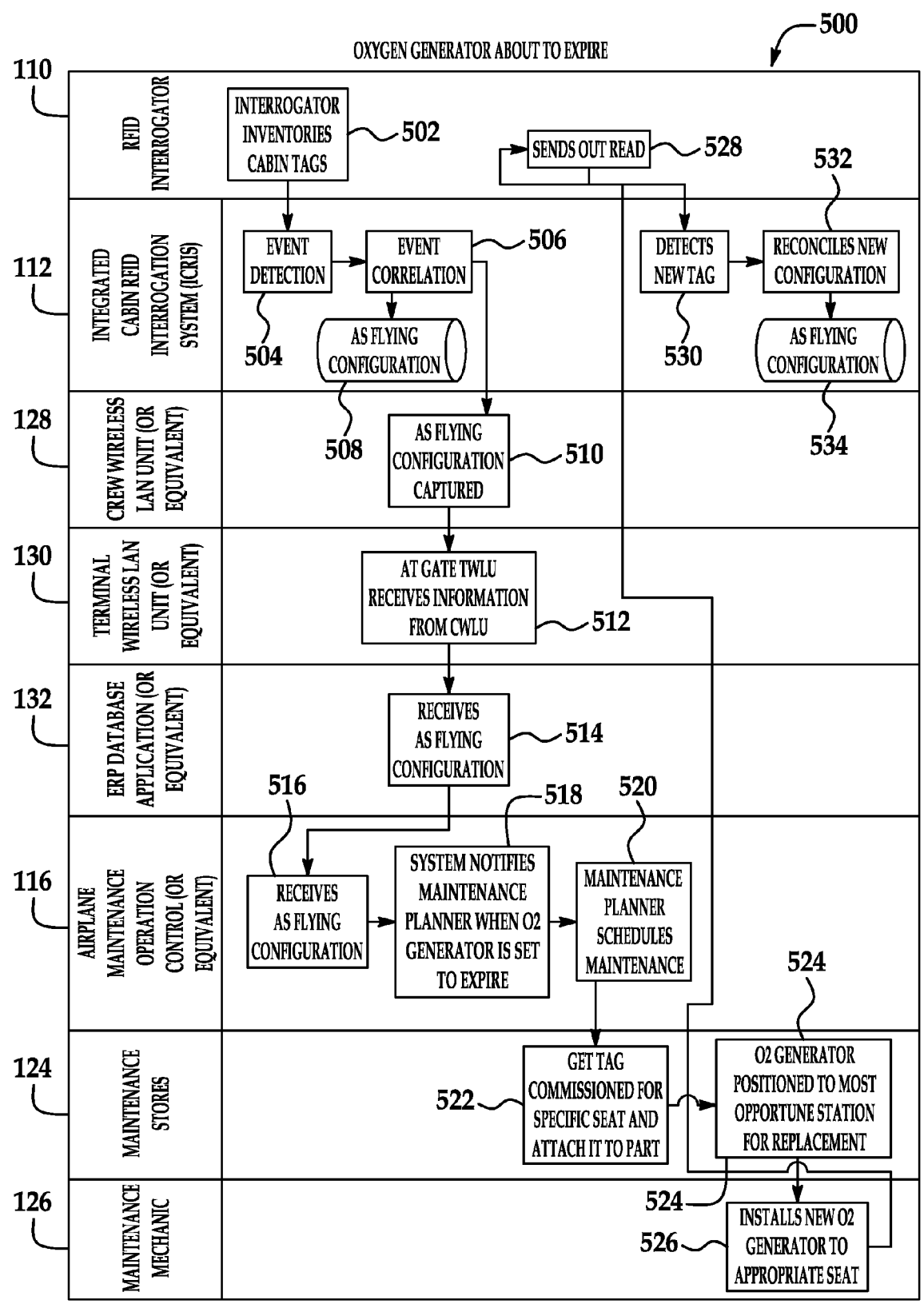
FIG. 5 is a flow diagram of an illustrative embodiment of the aircraft safety and configuration monitoring method in determining imminent expiration of an oxygen generator aboard an aircraft.

Referring next to FIG. 5, a flow diagram 500 of an illustrative embodiment of the aircraft safety and configuration monitoring method in determining imminent expiration of an oxygen generator aboard an aircraft is shown. In block 502, an RFIF interrogator 110 may inventory RFID tags on the RFID equipped items 108 (FIG. 1). In block 504, the processor 112 may make an event detection. In block 506, the processor 112 may make an event correlation as a flying configuration may be made as a flying configuration in block 508. In block 510, a crew wireless LAN unit 128 may capture the event as a flying configuration. In block 512, a terminal wireless LAN unit 130 may receive information regarding the event. In block 514, an ERP database application 132 may receive the event as a flying configuration. In block 516, the AMOC 116 may receive the event as a flying configuration. In block 518, the AMOC 116 may notify the maintenance planner when the oxygen generator is set to expire. In block 520, the maintenance planner may schedule maintenance.

In block 522, maintenance stores 124 may commission an RFID tag for a specific seat on the aircraft 101 and attach the RFID tag to the part. In block 524, maintenance stores 124 may position the oxygen generator to the most opportune station for replacement. In block 526, a maintenance mechanic 126 may install the replacement oxygen generator to the appropriate seat on the aircraft 101.

The use case in which a life vest is scheduled to expire may follow the same steps as was set forth herein above with respect to imminent expiration of the oxygen generator except maintenance planning may order a replacement life vest rather than an oxygen generator. A mechanic may not be necessary for installation of the replacement life vest. The use case in which emergency equipment is scheduled to expire may follow the same steps as was set forth herein above with respect to imminent expiration of the oxygen generator except maintenance planning may order replacement emergency equipment.

A Use Case Description of imminent expiration of the oxygen generator is presented in tabular form in Table (II) below.

TABLE II

| Imminent Expiration of Oxygen Generator | |
|---|---|
| Use Case Name | Oxygen generator is about to expire |
| Purpose | If an oxygen generator is scheduled to expire. |
| Actors | Maintenance Operation Center, Maintenance Planning, Mechanic |
| Pre-condition | Oxygen generator reaches threshold predetermined by airline to spur maintenance. |
| Steps | 1. Cabin RFID interrogation system scans the airplane and inventories cabin tags.<br>2. Integrated cabin RFID interrogation system (ICRIS) captures as-flying configuration.<br>3. When the airplane arrives at the gate the current plane configuration is automatically sent through Crew Wireless LAN Unit (CWLU) or an equivalent system to Terminal Wireless LAN Unit (TWLU) or an equivalent system.<br>4. Current plane configuration is sent to the ERP Database Application or equivalent system.<br>5. Current plane configuration is sent to Airplane Maintenance Operation Center or equivalent.<br>6. The Airplane Maintenance Operation Center or equivalent sends Maintenance Planner a message indicating the oxygen generator is set to expire when the generator has reached a pre-determined date of expiration.<br>7. Maintenance Planner schedules the maintenance into the Maintenance Scheduling Management system.<br>8. The maintenance store acquires a new oxygen generator and an RFID tag is commissioned for the oxygen generator identifying the expiration date and seat it will be installed on.<br>9. Oxygen generator is delivered to maintenance site.<br>10. Mechanic installs the oxygen generator in the proper position. |

TABLE II-continued

| Imminent Expiration of Oxygen Generator | |
|---|---|
| | 11. The interrogator reads the aircraft and detects a new tag.<br>12. The information from the new tag is populated into ICRIS stating the as-flying configuration database. |

Figure 6:
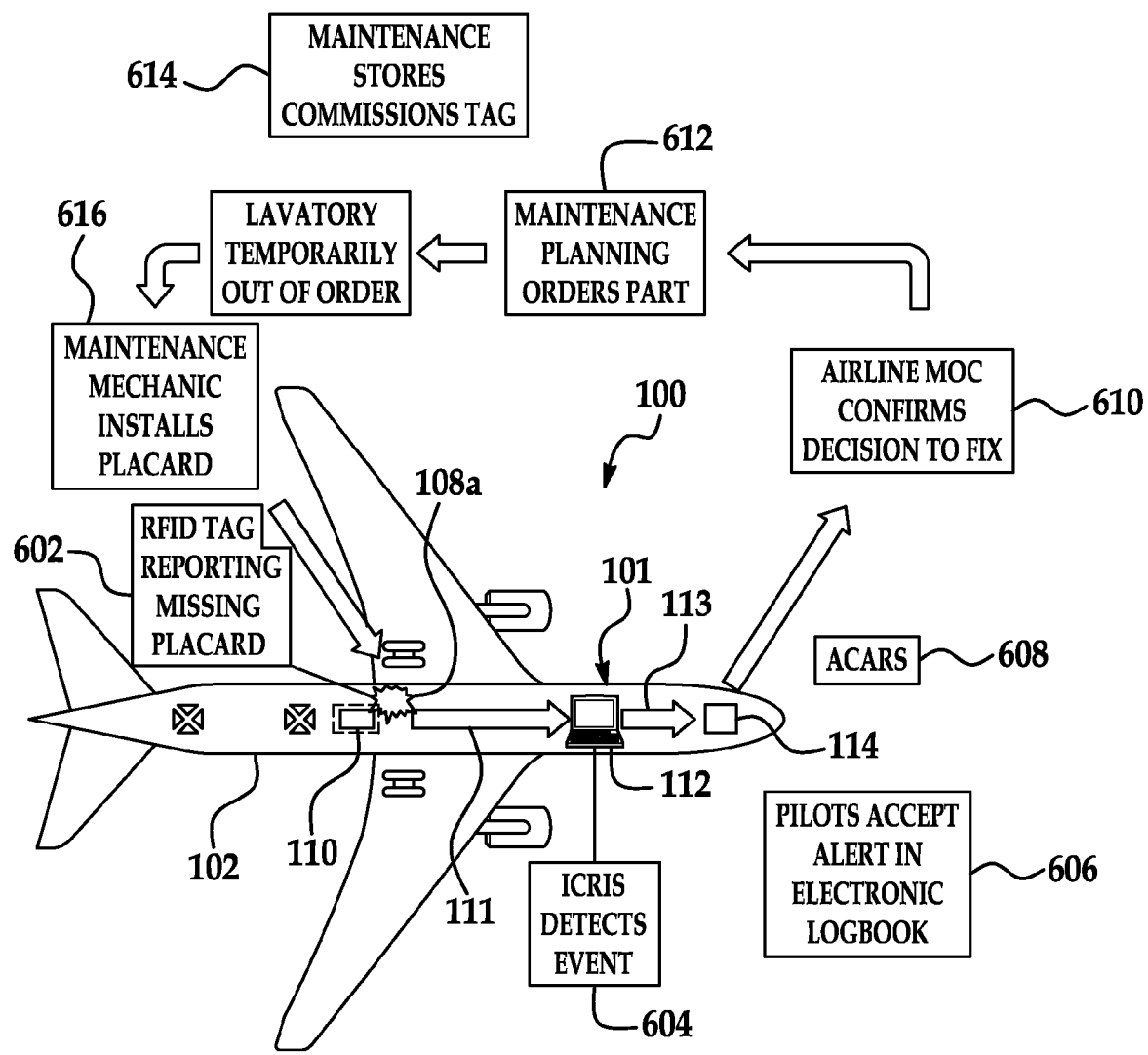
FIG. 6 is a block diagram illustrating implementation of an illustrative embodiment of the aircraft safety and configuration monitoring system in determining broken or missing status of a placard aboard an aircraft.

Referring next to FIG. 6, a block diagram illustrating implementation of an illustrative embodiment of the aircraft safety and configuration monitoring system 100 in determining broken or missing status of a placard 108b aboard an aircraft 101 is shown. In block 602, an RFID tag may report a missing placard 108b to an RFID interrogator 110. In block 604, the processor 112 may detect the event from the RFID tag and transmit the event to the flight deck 114. In block 606, pilots of the aircraft 101 may accept the alert to the event which may be recorded in the electronic logbook of the aircraft 101.

In block 608, the flight deck 114 may transmit the event regarding the missing placard 108b to the AMOC 116. In block 610, the AMOC 116 may confirm the decision to replace the missing placard 108b. In block 612, maintenance planning may order a replacement placard 108b. In block 614, maintenance may store the commissions RFID tag of the replacement placard 108b. In block 616, a maintenance mechanic may install the replacement placard 108b in the aircraft 101.

Figure 7:
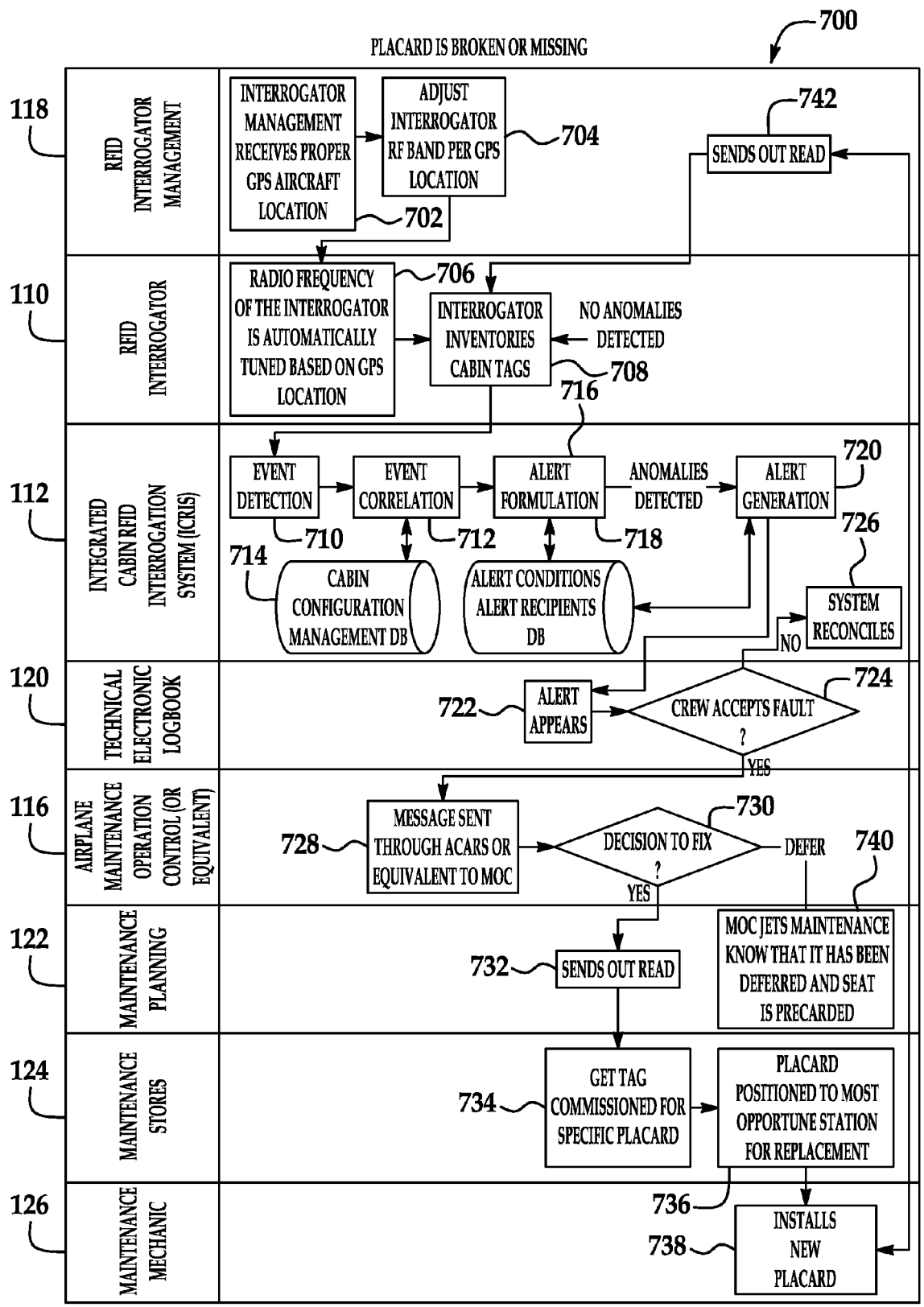
FIG. 7 is a flow diagram of an illustrative embodiment of the aircraft safety and configuration monitoring method in determining broken or missing status of a placard aboard an aircraft.

Referring next to FIG. 7, a flow diagram 700 of an illustrative embodiment of the aircraft safety and configuration monitoring method in determining broken or missing status of a placard aboard an aircraft 101 is shown. In block 702, RFID interrogation management 118 may receive a proper GPS aircraft location. In block 704, the RFID interrogation management 118 may adjust the interrogator RF band per the GPS location. In block 706, the radio frequency (RF) of the RFID interrogator 110 may be automatically tuned based on the GPS location. In block 708, the RFID interrogator 110 may inventory the RFID tags in the cabin of the fuselage 102 of the aircraft 101.

In block 710, the processor 112 may detect an event regarding the missing placard. In block 712, the processor 112 may make an event correlation using a cabin configuration management database 714. In block 716, the processor 112 may make an alert formulation using an alert conditions and alert recipients database 718. In block 720, the processor 112 may make an alert generation. In block 722, an alert may appear on the technical electronic logbook 120. In block 724, the crew may decide whether to accept the alert (block 728) or defer the alert (block 726).

If the crew decides to defer the alert, in block 726 the processor 112 may reconcile the system 100. If the crew decides to accept the alert, in block 728 a message is sent to the AMOC 116. In block 730, a decision is made on whether to fix the issue (block 732) or to defer the issue (block 740). If the crew decides to fix the issue, in block 732, maintenance planning 122 may order the part. If the crew decides to defer the issue, in block 740 the AMOC 116 may inform maintenance planning 122 that the decision has been deferred and the placard is placarded.

If the maintenance planning 122 orders the part in block 732, the maintenance stores 124 may have an RFID tag commissioned for a specific placard. In block 736, the maintenance stores 124 may position the placard to the most opportune station for replacement. In block 738, a maintenance mechanic 126 may install a new placard in the aircraft 101. In block 740, RFID interrogator management 118 may send out a read to the RFID interrogator 110 which indicated the event.

When the processor 112 reads the number of emergency cards on the airplane and that number is less than the expected number, the flight crew may be notified and new emergency cards may be delivered to the aircraft 101. The flight crew may then be responsible for checking each seat and reconciling the problem so there is one emergency card per seat.

A Use Case Description of a broken or missing placard is presented in tabular form in Table (III) below.

TABLE III

| | Broken or Missing Placard |
|---|---|
| Use Case Name | Placard is broken or missing |
| Purpose | Aircraft is able to self-diagnose when a placard either is missing or is no longer attached to its intended home |
| Actors | Pilot, Maintenance Operation Center, Maintenance Planning, Mechanic |
| Pre-condition | Placard is not certified to fly for one of the following reasons: |
| Post-condition | A new oxygen generator has been installed on the airplane |
| Steps | 1. Interrogator inventories cabin tags.<br>2. Integrated cabin RFID interrogation system (ICRIS) detects an event.<br>3. ICRIS correlates the event against the pre-defined as flying configuration.<br>4. ICRIS identifies which tag is missing and creates an alert.<br>5. ICRIS sends an alert to the Technical Electronic Logbook.<br>6. Alert appears to pilots that placard is no longer present in intended position.<br>7. Pilot accepts alert.<br>8. ICRIS system reconciles to account for failed tag.<br>9. Alert is sent through ACARS or equivalent system to Airline Maintenance Operation Control (AMOC) or equivalent.<br>10. AMOC or equivalent accepts notification to replace the placard.<br>11. AMOC Operator or equivalent orders the placard.<br>12. Maintenance store commissions a tag (including placard type and location) for the specific placard that is missing.<br>13. Placard is positioned to most opportune station for replacement.<br>14. Mechanic installs the placard in the proper location. |

Figure 8:
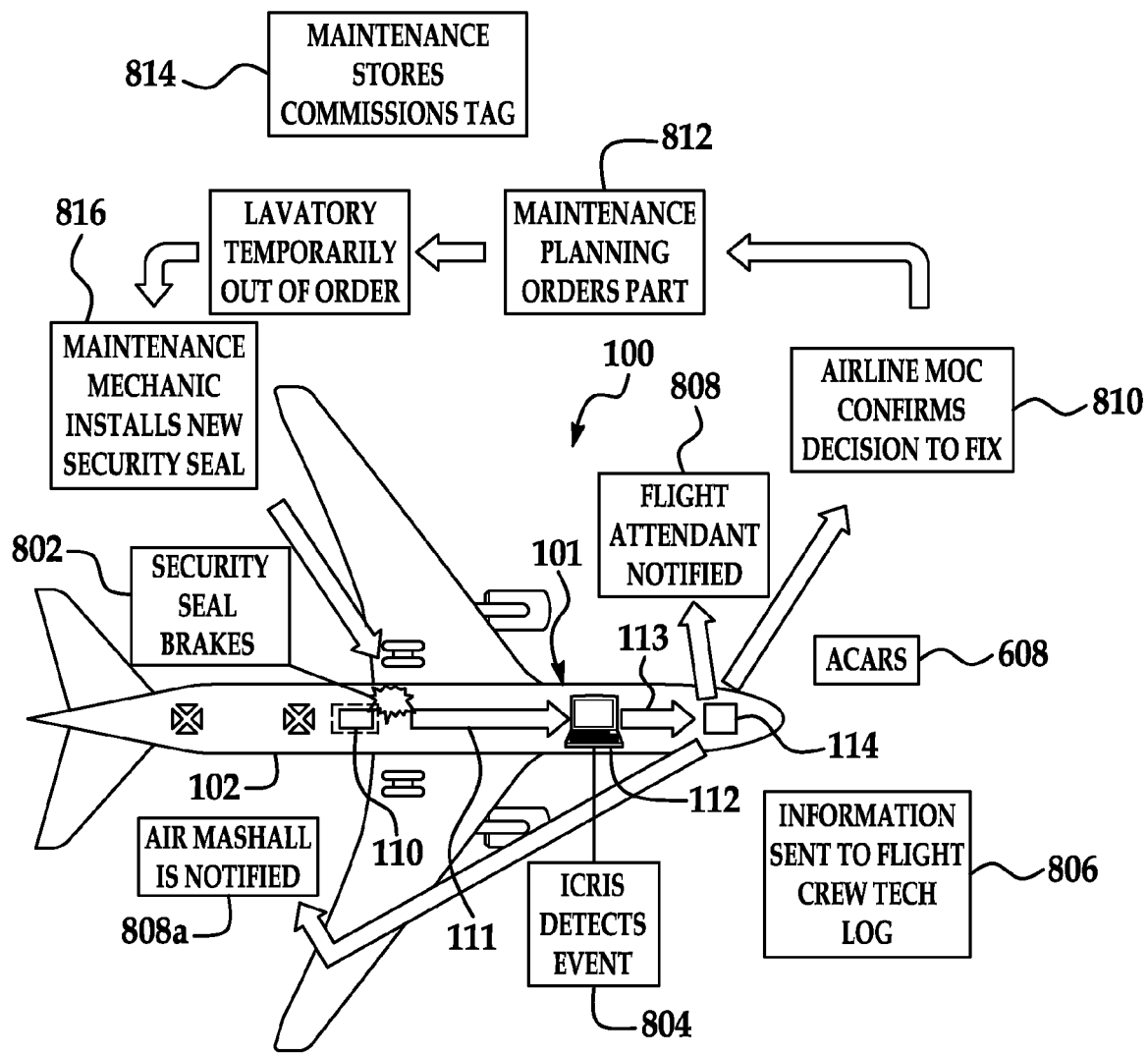
FIG. 8 is a block diagram illustrating implementation of an illustrative embodiment of the aircraft safety and configuration monitoring system in determining the presence of security seal breaks aboard an aircraft.

Referring next to FIG. 8, a block diagram illustrating implementation of an illustrative embodiment of the aircraft safety and configuration monitoring system 100 in determining the presence of security seal breaks aboard an aircraft 101 is shown. In block 802, an RFID tag may report a broken security seal to an RFID interrogator 110. In block 804, the processor 112 may detect the event from the RFID tag and transmit the event to the flight deck 114. In block 806, information regarding the event may be transmitted to the flight deck 114 and recorded in the electronic logbook of the aircraft 101.

In block 808, the flight deck 114 may notify a flight attendant to the break of the security seal. In block 810, the flight deck 114 may additionally or alternatively transmit the event regarding the broken security seal to the AMOC 116. In block 810, the AMOC 116 may confirm the decision to fix the broken security seal. In block 812, maintenance planning may order a replacement security seal. In block 814, maintenance may store the commissions RFID tag of the replacement security seal. In block 816, a maintenance mechanic may install the replacement security seal in the aircraft 101.

Figure 9:
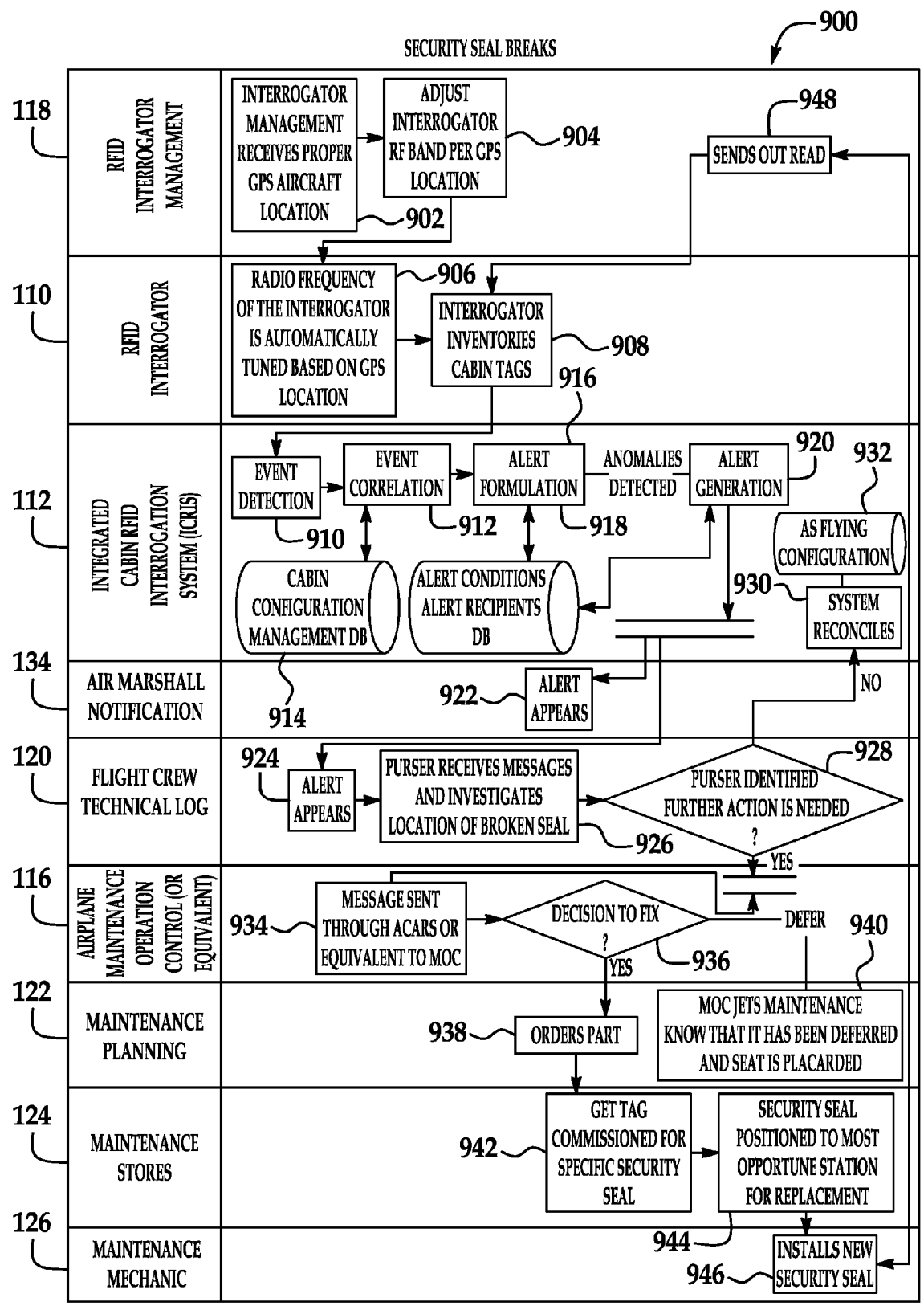
FIG. 9 is a flow diagram of an illustrative embodiment of the aircraft safety and configuration monitoring method in determining the presence of security seal breaks aboard an aircraft.

Referring next to FIG. 9, a flow diagram 900 of an illustrative embodiment of the aircraft safety and configuration monitoring method in determining the presence of security seal breaks aboard an aircraft 101 is shown. In block 902, RFID interrogation management 118 may receive a proper GPS aircraft location. In block 904, the RFID interrogation management 118 may adjust the interrogator RF band per the GPS location. In block 906, the radio frequency (RF) of the RFID interrogator 110 may be automatically tuned based on the GPS location. In block 908, the RFID interrogator 110 may inventory the RFID tags in the cabin of the fuselage 102 of the aircraft 101.

In block 910, the processor 112 may detect an event regarding the broken security seal. In block 912, the processor 112 may make an event correlation using a cabin configuration management database 914. In block 916, the processor 112 may make an alert formulation using an alert conditions and alert recipients database 918. In block 920, the processor 112 may make an alert generation. In block 922, an alert may appear on an air marshal notification 134. In block 924, an alert may additionally or alternatively appear in a flight crew technical log 120. In block 926, purser may receive the messages regarding the broken security seal and investigate the location of the broken security seal. In block 928, purser may identify whether further action is needed.

In block 934, the messages regarding the broken security seal may be transmitted to the AMOK 116. In block 936, a decision may be made regarding whether to fix the security seal. If the AMOK 116 decides to fix the broken security seal in block 936, maintenance planning 122 may order a replacement security seal in block 938. If the decision to fix in block 936 is deferred, the AMOC 116 may notify maintenance planning 122 of the deferral and a placard may be placarded in block 940.

If the maintenance planning 122 orders a replacement security seal in block 938, an RFID tag may be commissioned for a specific replacement security seal in block 942. In block 944, the replacement security seal may be positioned to the most opportune station for replacement. In block 946, a maintenance mechanic 126 may install the replacement security seal in the aircraft 101.

If the crew decides to defer the alert, in block 726 the processor 112 may reconcile the system 100. If the crew decides to accept the alert, in block 728 a message is sent to the AMOC 116. In block 730, a decision is made on whether to fix the issue (block 732) or to defer the issue (block 740). If the crew decides to fix the issue, in block 732, maintenance planning 122 may order the part. If the crew decides to defer the issue, in block 740 the AMOC 116 may inform maintenance planning 122 that the decision has been deferred and the placard is placarded.

If the maintenance planning 122 orders the part in block 732, the maintenance stores 124 may have an RFID tag commissioned for a specific placard. In block 736, the maintenance stores 124 may position the placard to the most opportune station for replacement. In block 738, a maintenance mechanic 126 may install a new placard in the aircraft 101. In block 740, RFID interrogator management 118 may send out a read to the RFID interrogator 110 which indicated the event. In block 948, RFID interrogator management 118 may send out a read to the RFID interrogator 110 which indicated the event.

Figure 10:
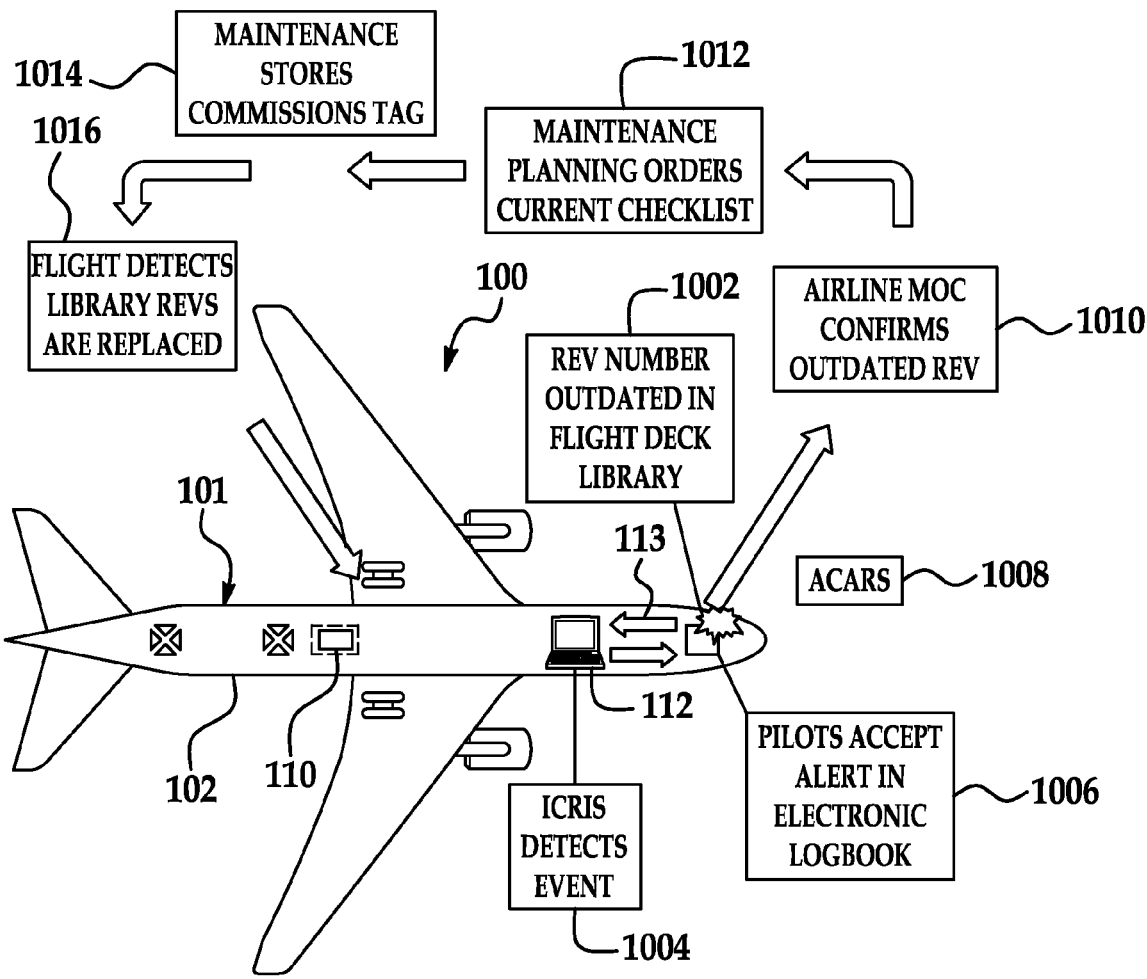
FIG. 10 is a block diagram illustrating implementation of an illustrative embodiment of the aircraft safety and configuration monitoring system in determining whether deck library checklist revs aboard an aircraft are out of date.

Referring next to FIG. 10, implementation of a block diagram illustrating implementation of an illustrative embodiment of the aircraft safety and configuration monitoring system 100 in determining whether deck library checklist revs aboard an aircraft 101 are out of date is shown. In block 1002, an RFID tag may report that a rev number is outdated in a flight deck library of the flight deck 114. In block 1004, the processor 112 may detect the event and transmit the non-certified status of the oxygen generator 108a to the electronic logbook of the flight deck 114. In block 1006, pilots of the aircraft 101 may accept the alert recorded in the electronic logbook of the aircraft 101.

In block 1008, the flight deck 114 may transmit the event regarding the outdated rev number in the flight deck library to the AMOC 116. In block 1010, the AMOC 116 may confirm the outdated rev number. In block 1012, maintenance planning may order a current checklist. In block 1014, maintenance may store the commissions RFID tag of the current checklist. In block 1016, the flight deck library revs may be replaced.

Figure 11:
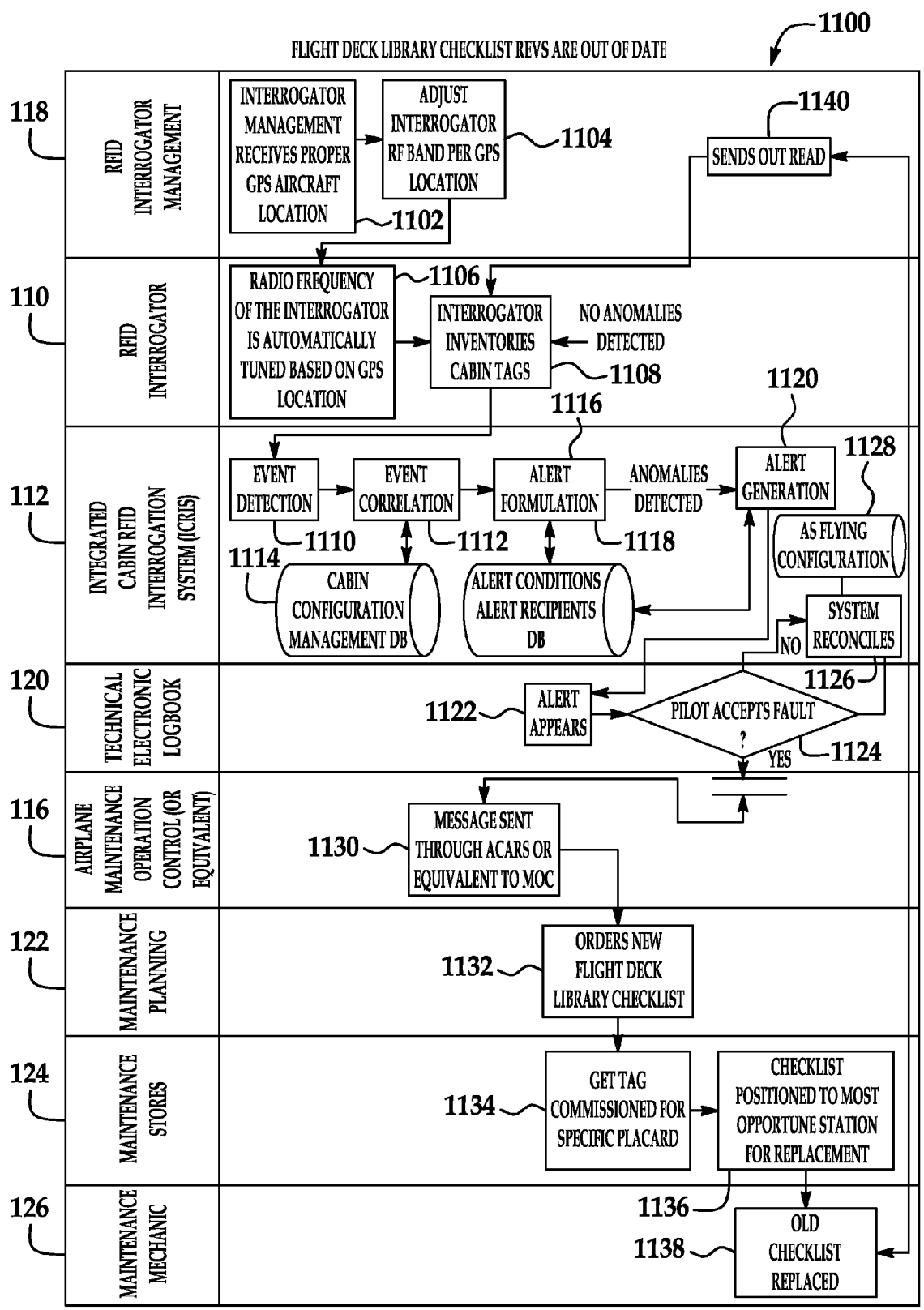
FIG. 11 is a flow diagram of an illustrative embodiment of the aircraft safety and configuration monitoring method in determining whether deck library checklist revs aboard an aircraft are out of date.

Referring next to FIG. 11, a flow diagram 1100 of an illustrative embodiment of the aircraft safety and configuration monitoring method in determining whether deck library checklist revs aboard an aircraft 101 are out of date is shown. In block 1102, RFID interrogator management 118 may receive a proper GPS aircraft location for the aircraft 101. In block 1104, RFID interrogator management 118 may adjust the interrogator RF band per the GPS location. In block 1106, the radio frequency (RF) of the RFID interrogator 110 may be automatically tuned based on the GPS location. In block 1108, the RFID interrogator 110 may inventory the cabin RFID tags of the RFID equipped items 108 (FIG. 1). In block 1110, the processor 112 may make an event detection. In block 1112, the processor 112 may make an event correlation using a cabin configuration management database in block 1114. In block 1116, the processor 112 may make an alert formulation using an alert conditions alert recipients database in block 1118. In block 1120, the processor 112 may make an alert generation.

In block 1122, an alert may appear in the technical electronic logbook 120 in the flight deck 114 (FIG. 1). In block 1124, the crew of the aircraft 101 may accept or defer the alert which appears in the electronic logbook 120 of the aircraft 101. In block 1126, the system 100 may reconcile as a flying configuration (block 1128) in the event that the crew does not accept the alert. In the event that the crew does accept the alert, in block 1130 a message may be sent to the AMOC 116.

In block 1132, maintenance planning 122 may order a new flight deck library checklist. In block 1134, maintenance stores 124 may commission an RFID tag for the checklist. In block 1136, maintenance stores 124 may position the checklist to the most opportune station for replacement on the aircraft 101. In block 1138, the checklist may be replaced on the aircraft 101. In block 1140, RFID interrogator management 118 may send out a read to the RFID interrogator 110 which indicated the event.

A Use Case Description of security seal breakage is presented in tabular form in Table (IV) below.

TABLE IV

| | Security Seal Breaks |
|---|---|
| Use Case Name | Security seal breaks |
| Purpose | If a security seal breaks anywhere within the interior cabin the appropriate personnel will be notified during flight. |
| Actors | Air Marshal, Flight Attendants, Maintenance Operation Center, Maintenance Planning, Mechanic |
| Pre-condition | Security seals that have been tampered with can be found on the following items within the cabin: |

TABLE IV-continued

| | Security Seal Breaks |
|---|---|
| | 1. Door Seals<br>2. Smoke Detector<br>3. Security Seals on panels |
| Post-condition | Proper personnel have been notified and a new security seal has been installed. |
| Steps | 1. Interrogator inventories cabin tags.<br>2. Integrated cabin RFID interrogation system (ICRIS) detects an event.<br>3. ICRIS correlates the event against the predefined as flying configuration.<br>4. ICRIS identifies which tag has been tampered with and creates an alert.<br>5. ICRIS sends an alert to the purser through the flight crew tech log or similar system and if applicable the on-board air marshal.<br>6. Alert appears showing the location of the tampered security seal.<br>7. The Purser takes care of the situation as he/she sees fit. If a new part is needed to be ordered the Purser sends the alert through the tech log that a new security seal is needed.<br>8. ICRIS system reconciles to account for failed tag.<br>10. AMOC or equivalent accepts notification for the broken seal.<br>11. AMOC Operator or equivalent orders new security seal.<br>12. Maintenance store commissions a tag for the specific location of security. |

Figure 12:
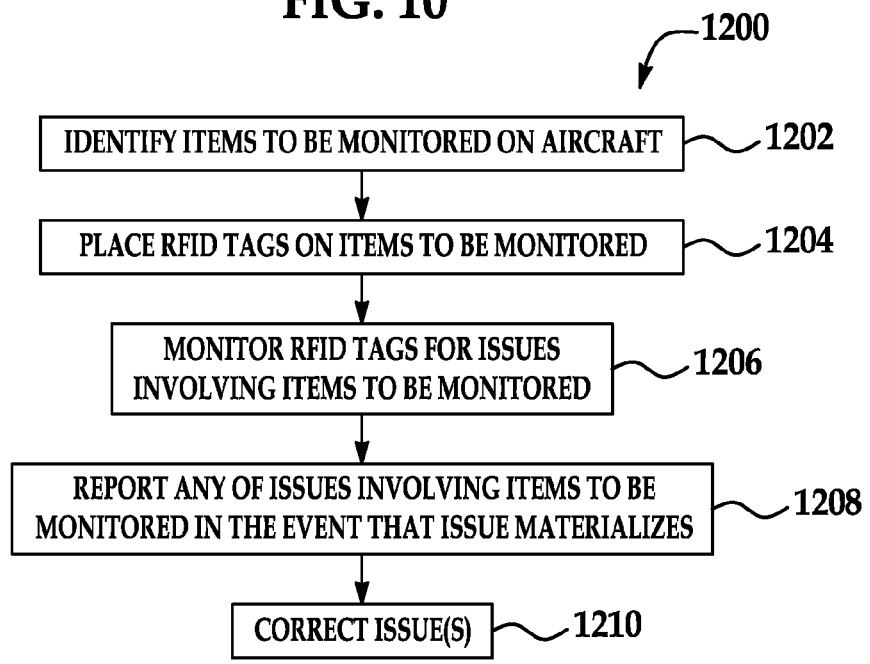
FIG. 12 is a flow diagram which summarizes an illustrative embodiment of the aircraft safety and configuration monitoring method.

Referring next to FIG. 12, a flow diagram 1200 which summarizes an illustrative embodiment of the aircraft safety and configuration monitoring method is shown. In block 1202, items to be monitored on an aircraft may be identified. In various applications the items may include oxygen generators, placards, security seals, life vests, emergency equipment and/or a flight deck library checklist, for example and without limitation. In block 1204, RFID tags may be placed on each of the items to be monitored. In block 1206, the RFID tags may be monitored for issues involving the items to be monitored. In block 1208, any of the issues involving the items to be monitored may be reported in the event that any of the issues materializes. In some embodiments, any of the issues may be reported to an airline maintenance operation control system in the event that any of the issues materializes. In block 1210, the issue or issues may be corrected.

Figure 13:
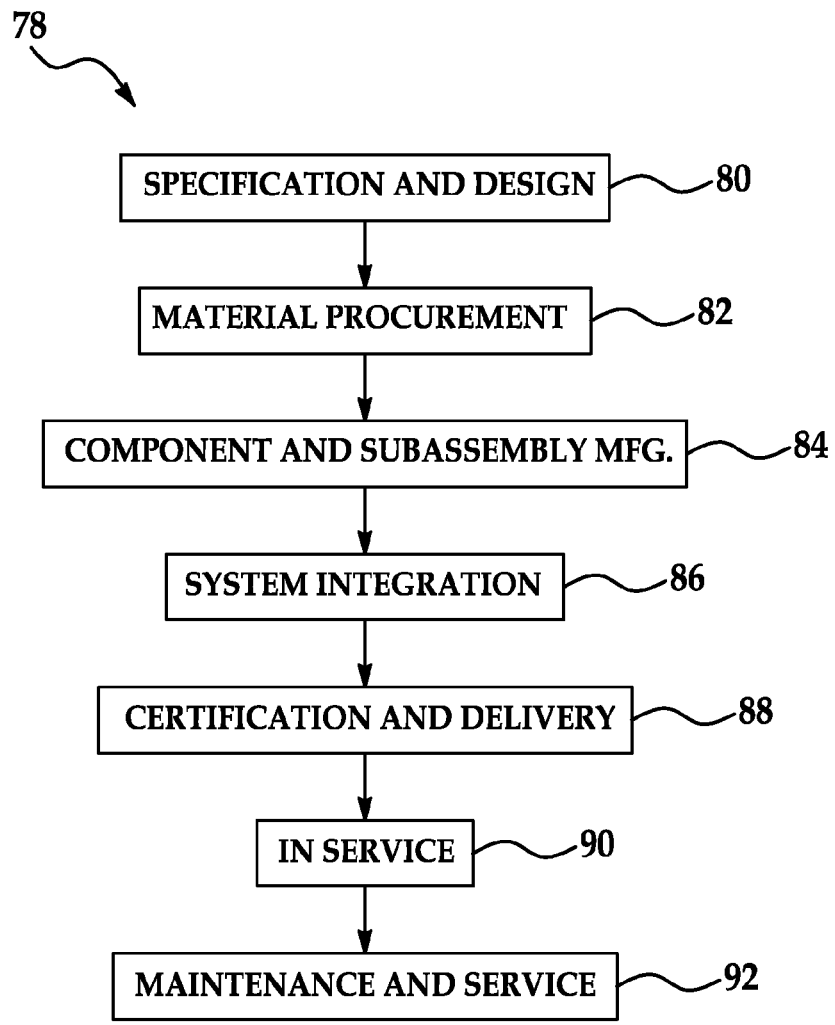
FIG. 13 is a flow diagram of an aircraft production and service methodology.
Figure 14:
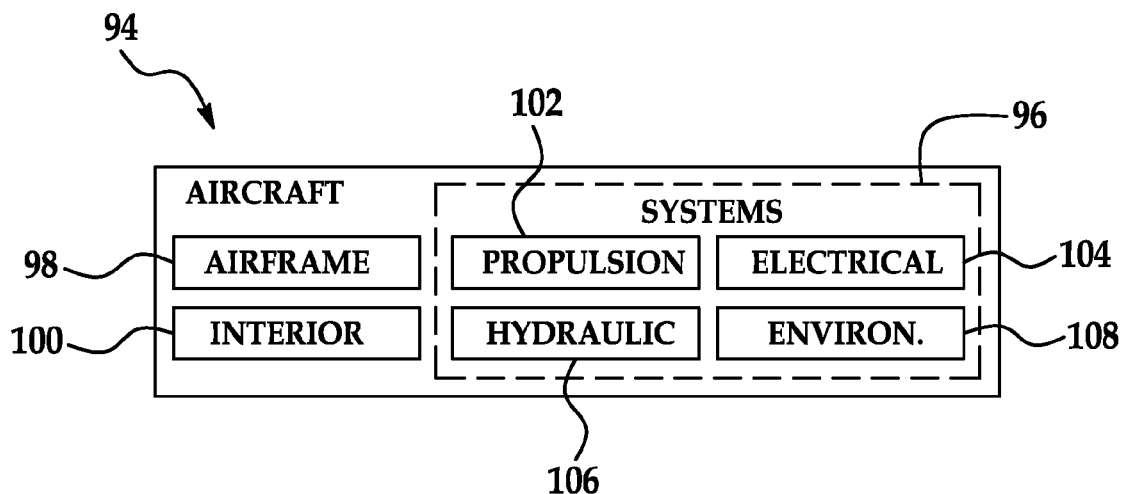
FIG. 14 is a block diagram of an aircraft.

Referring next to FIGS. 13 and 14, embodiments of the disclosure may be used in the context of an aircraft manufacturing and service method 78 as shown in FIG. 13 and an aircraft 94 as shown in FIG. 14. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. An aircraft configuration monitoring system, comprising:
   a plurality of RFID equipped items in a pressurized cabin of an aircraft selected from among oxygen generators, placards, flight deck library checklists, and combinations thereof;
   a plurality of RFID interrogators configured to communicate with said plurality of RFID equipped items and integrated into the system by affixing to the aircraft in the pressurized cabin;
   a processor separated from the plurality of RFID equipped items and separated from but configured to communicate with said plurality of RFID interrogators and configured to determine an issue with respect to any of said plurality of RFID equipped items;
   an indicating mechanism configured to communicate with said processor and configured to indicate said issue; and
   an airline maintenance operation control system configured to communicate with said indicating mechanism and to initiate service, repair, replacement, and/or maintenance of the RFID equipped items to maintain safe configuration of the oxygen generators, placards, flight deck library checklists, and combinations thereof.

2. The system of claim 1 wherein said indicating mechanism comprises a flight crew technical electronic logbook of the aircraft.

3. An aircraft configuration monitoring system, comprising: an aircraft;
   a plurality of RFID equipped items that are components of systems affixed to said aircraft, the RFID equipped items being selected from among oxygen generators, placards, flight deck library checklists, and combinations thereof;
   a plurality of RFID interrogators communicating with said plurality of RFID equipped items;
   a processor separated from the plurality of RFID equipped items and separated from but configured to communicate with said plurality of RFID interrogators and configured to determine an issue with respect to any of said plurality of RFID equipped items, the issue including service, repair, replacement, and/or maintenance of said plurality of RFID equipped items; and
   an indicating mechanism configured to communicate with said processor and adapted to indicate said issue to monitor safe configuration of the plurality of RFID equipped items selected from oxygen generators, placards, flight deck library checklists, and combinations thereof, in the systems affixed to said aircraft.

4. The system of claim 3 wherein said plurality of RFID equipped items comprises a plurality of RFID equipped oxygen generators.

5. The system of claim 3 wherein said plurality of RFID equipped items comprises a plurality of RFID equipped placards.

6. The system of claim 3 wherein said plurality of RFID equipped items further comprises a plurality of RFID equipped security seals.

7. The system of claim 6 wherein the RFID equipped items further comprise security seals selected from the group consisting of door seals, smoke detector seals, and security seals on panels.

8. The system of claim 3 wherein said plurality of RFID equipped items comprises a flight deck library checklist.

9. The system of claim 3 further comprising a flight deck configured to communicate with said processor and wherein said indicating mechanism comprises a flight crew technical electronic logbook of said aircraft configured to communicate with said flight deck and the interrogators are integrated into the systems by affixing to the aircraft.

10. The system of claim 9 further comprising an airline maintenance operation control system configured to communicate with said flight deck, to receive a report of the issue from the flight deck, and to initiate the service, repair, replacement, and/or maintenance.

11. The system of claim 3 wherein the plurality of RFID equipped items are in a pressurized cabin of the aircraft.

12. An aircraft configuration monitoring method, comprising: using a plurality of items to be monitored as components of systems affixed to an aircraft, the plurality of items selected from among oxygen generators, placards, flight deck library checklists, and combinations thereof;
   using a plurality of RFID tags on said plurality of items, respectively;
   monitoring said plurality of RFID tags for one or more issues involving said plurality of items, the issues including service, repair, replacement, and/or maintenance of said plurality of items to maintain safe configuration of the plurality items selected from oxygen generators, placards, flight deck library checklists, and combinations thereof, in the systems affixed to the aircraft; and reporting an occurrence of the one or more issues.

13. The method of claim 12 wherein said plurality of items further includes at least one item selected from among security seals, life vests, emergency equipment, and combinations thereof.

14. The method of claim 12 wherein said reporting comprises reporting to an airline maintenance operation control system.

15. The method of claim 14 further comprising correcting the one or more issues.

16. The method of claim 15 wherein the method further comprises the airline maintenance operation control system initiating the service, repair, replacement, and/or maintenance.

17. The method claim 12 wherein the plurality of items are in a pressurized cabin of the aircraft.

18. The method claim 12 wherein the monitoring comprises monitoring a configuration of the systems on the aircraft by interrogating the plurality of RFID tags.

19. The method of claim 18 wherein the monitoring further comprises using interrogators integrated into the systems by affixing to the aircraft.

20. The method of claim 18 further comprising detecting an event using the interrogating, correlating the event against an aircraft configuration management database, and determining the occurrence of the issue as an inconsistency with the configuration in the database.

* * * * *